United States Patent
Iwashita et al.

(10) Patent No.: US 7,540,808 B2
(45) Date of Patent: Jun. 2, 2009

(54) POWER TRANSMISSION SHAFT, POWER TRANSMISSION DEVICE INCORPORATING THE SAME AND METHOD OF FORMING THE SAME

(75) Inventors: Hiroyuki Iwashita, Chita-gun (JP); Tadashi Naganawa, Chiryu (JP); Isashi Kashiwagi, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 318 days.

(21) Appl. No.: 11/384,526

(22) Filed: Mar. 21, 2006

(65) Prior Publication Data

US 2006/0217209 A1  Sep. 28, 2006

(30) Foreign Application Priority Data

Mar. 28, 2005 (JP) .............................. 2005-093286

(51) Int. Cl.
*F16D 3/84* (2006.01)

(52) U.S. Cl. ..................................................... 464/175

(58) Field of Classification Search .................. 464/175, 464/173, 174; 277/634–637
See application file for complete search history.

(56) References Cited

U.S. PATENT DOCUMENTS

| 3,817,057 | A | * | 6/1974 | Orain ...................... 464/175 X |
| 5,672,113 | A | * | 9/1997 | Tomogami et al. .......... 464/175 |
| 5,725,433 | A | * | 3/1998 | Kudo et al. ................ 464/175 |
| 6,244,967 | B1 | * | 6/2001 | Takabe et al. .............. 464/175 |

FOREIGN PATENT DOCUMENTS

JP  2001-315539  11/2001

* cited by examiner

*Primary Examiner*—Greg Binda
(74) *Attorney, Agent, or Firm*—Oblon, Spivak, McClelland, Maier & Neustadt, P.C.

(57) ABSTRACT

A power transmission shaft includes a swaged boot-engaging groove on an outer circumference of thereof. Further, the power transmission shaft includes a reduced diameter portion provided in the vicinity of the boot-engaging groove. The reduced diameter portion is formed by swaging at the same time as the boot-engaging groove is formed.

9 Claims, 5 Drawing Sheets

POWER TRANSMISSION SHAFT, POWER TRANSMISSION DEVICE INCORPORATING THE SAME AND METHOD OF FORMING THE SAME

INCORPORATION BY REFERENCE

This application is based on and claims priority under 35 U.S.C. §119 with respect to Japanese Patent Application No. 2005-093286 filed on Mar. 28, 2005. The contents of that application are incorporated herein by reference.

BACKGROUND OF THE INVENTION

1. Field of the Invention

This invention relates to a power transmission shaft and a power transmission device using the same.

2. Description of the Related Art

A conventional power transmission device for a vehicle is described in, for example, Japanese Patent Laid-open Publication No. 2001-315539. The power transmission device includes an input shaft receiving a power from an engine, an intermediate shaft connected to the input shaft at one end thereof via a constant velocity joint, and an output shaft connected to the other end of the intermediate shaft via a constant velocity joint. Bellows-shaped boots are provided to cover a connecting portion between the constant velocity joints and the intermediate shaft respectively, so as to keep lubricant or the like within the constant velocity joints.

Around an outer circumference of the intermediate shaft, a boot-engaging groove is formed to fix the boots on the intermediate shaft. The boot has a protrusion on an inner circumference thereof to engage with the groove of the intermediate shaft. A clamp member is fixed on an outer circumference of the boot to urge the same onto a respective member. Thus, the intermediate shaft and the boot are mutually positioned in the axial direction while assuring sealing accuracy.

In the meanwhile, the boot-engaging groove of the conventional intermediate shaft is formed by a machining process. However, such a machining process for forming the groove may cause a problem of high cost.

SUMMARY OF THE INVENTION

Accordingly, the present invention is devised in view of the aforementioned circumstance, and aims to provide a power transmission shaft and a power transmission device including a boot-engaging groove formed by a working process capable of achieving low cost.

The present invention aims to provide a power transmission shaft including a boot-engaging groove on an outer circumference thereof, wherein the boot-engaging groove is formed by swaging.

The present invention also aims to provide a power transmission device including a power transmission shaft, a boot having an approximately cylindrical shape and a clamp member. The power transmission shaft includes a boot-engaging groove and a seal portion. The boot-engaging groove is formed by swaging on an outer circumference of the power transmission shaft. The seal portion of the boot-engaging groove is formed on the outer circumference of the power transmission shaft in the vicinity of the boot-engaging groove. The boot includes a protrusion and a seal portion. The protrusion protrudes from an inner circumference of the boot to come into contact with the boot-engaging groove. The seal portion of the boot is formed in the vicinity of the protrusion to come into contact with the seal portion of the power transmission shaft. The clamp member clamps an outer circumference of the boot at a portion which corresponds to the protrusion and the seal portion of the boot so as to urge the boot toward the power transmission shaft.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawing, in which.

DESCRIPTION OF THE PREFERRED EMBODIMENT

An embodiment according to the present invention will be described hereinafter with reference to the figures.

As an embodiment of the power transmission device according to the present invention, an explanation regarding a drive shaft 100 for a vehicle will be made. In addition, an explanation regarding an intermediate shaft 1 applied to the drive shaft 100 will also be made as an example of the power transmission shaft of the present invention.

Configuration of Drive Shaft for Vehicle

Figure 1:
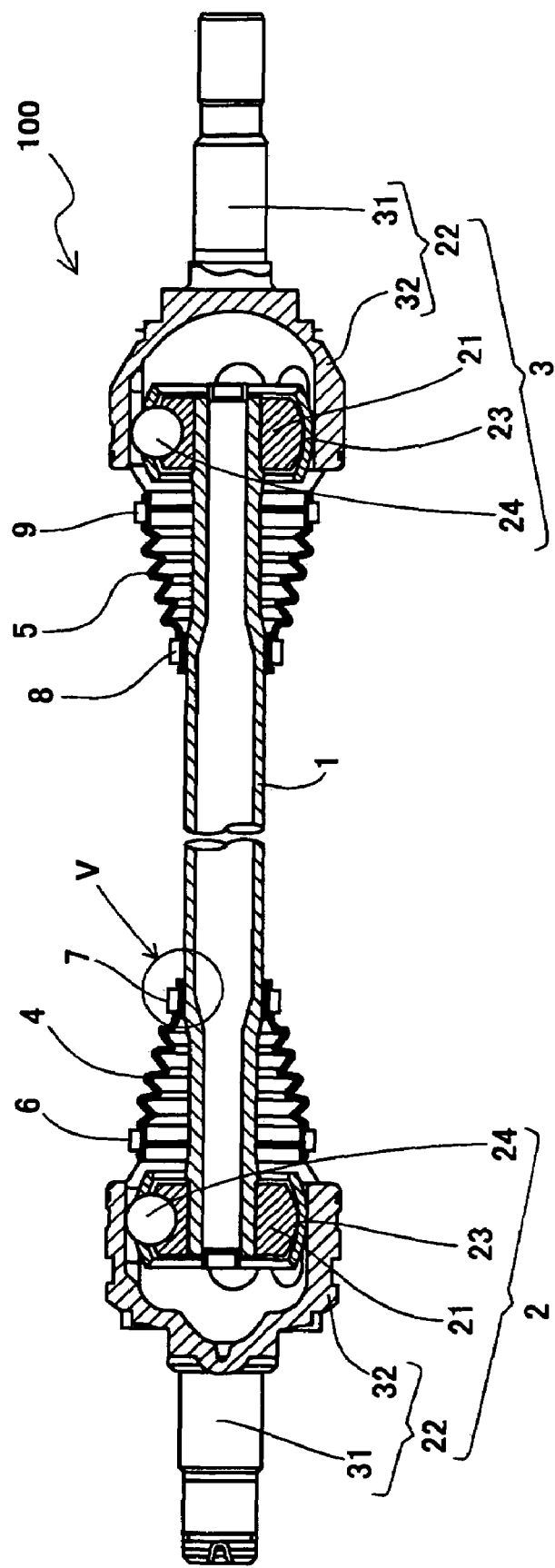
FIG. 1 is a cross sectional view of a drive shaft 100 for a vehicle.

The drive shaft 100 will be described with reference to FIG. 1. FIG. 1 is a cross sectional view of the drive shaft 100 for vehicle. As shown in FIG. 1, the drive shaft 100 includes the intermediate shaft 1, an inboard joint 2, an outboard joint 3, boots 4 and 5, and clamp members 6 to 9.

The intermediate shaft 1 is formed as a hollow rod and serves as power transmission shaft. The intermediate shaft 1 transmits power inputted from the inboard joint 2 to the outboard joint 3, i.e. transmits power from a drive part to a driven part.

Each of the inboard joint 2 and the outboard joint 3 is a constant velocity joint, which may include a fixed-type ball joint. The inboard joint 2 is attached to an input side of the intermediate shaft 1. The outboard joint 3 is attached to an output side of the intermediate shaft 1. Each of the inboard joint 2 and the outboard joint 3 includes an inner member 21, an outer member 22, a cage 23 and balls 24.

The inner member 21 has an approximately cylindrical shape. An outermost circumference of the inner member 21 is formed into a circular arc in the section taken along the axis thereof. In other words, the outermost circumference is formed as partial spherical surface. Six inner ball grooves having arc-like concave shapes are formed at the outer circumference of the inner member 21 in an arrangement centered on the axis of the inner member 21. The inner ball grooves are provided at equal intervals in a plane perpendicular to the axis of the inner member 21. Further, internal serrations are formed on an inner circumference of the inner member 21. External serrations 11 formed on the intermediate shaft 1 are press-fitted into the internal serration of the inner member 21. Thus, the inner member 21 integrally rotates with the intermediate shaft 1.

The outer member 22 includes a shaft portion 31 and a cylindrical portion 32. The cylindrical portion 32 has a bottom to which one end of the shaft portion is integrally connected. An innermost circumference of the cylindrical portion 32 is formed into a circular arc in the section taken along the axis thereof. In other words, the innermost circumference is formed as a partial spherical surface. Six outer ball grooves having arc-like concave shapes are formed at an inner circumference of the cylindrical portion 32 in an arrangement centered on the axis of the outer member 22. The outer ball grooves are provided at equal intervals in a plane perpendicular to the axis of the outer member 22. A boot-engaging groove for fixing the boot 4 or 5 is formed on the entire outer circumference of the cylindrical portion 32. The boot-engaging groove is a concave section in the sectional view taken along the axis of the cylindrical portion 32.

The cage 23 having an approximately cylindrical shape is interposed between the inner member 21 and the cylindrical member 32 of the outer member 22. An inner circumference of the cage 23 is formed to correspond to the outermost circumference of the inner member 21. On the other hand, an outer circumference of the cage 23 is formed to correspond to the innermost circumference of the cylindrical portion 32 of the outer member 22. That is, the cage 23 can turn relatively to the inner member 21 and the cylindrical member 32 of the outer member 22 without contact therewith. Further, the cage 23 has six approximately rectangular opening at circular equal intervals.

Each of the balls 24 is interposed between the inner ball groove of the inner member 21 and the outer ball groove of the cylindrical member 32 of the outer member 22 to roll freely. Further, each of the balls 24 is inserted into the opening of the cage 23. Accordingly, a rotation of the inner member 21 is transmitted to the outer member 22 through the balls 24, or a rotation of the outer member 22 is transmitted to the inner member 21 through the balls 24.

Boots 4 and 5 have a bellows-like shape. One end of the boot 4 or 5 is fixed to a boot-engaging groove 14 of the intermediate shaft 1. The other end of the boot 4 is fixed to the boot-engaging groove of the inboard joint 2 while the other end of the boot 5 is fixed to the boot-engaging groove of the outboard joint 3. The boot 4 covers or seals an inside of the inboard joint 2 while the boot 5 covers or seals the inside of the outboard joint 3. Thus the boots 4 and 5 respectively prevent lubricant contained within the inboard joint 2 and the outboard joint 3 from leaking out. Further, the boots 4 and 5 respectively protect insides of the inboard joint 2 and outboard joint 3 from dust or the like.

The clamp member 6 is adapted to fix the other end of the boot 4 onto the outer member 22 of the inboard joint 2. The clamp member 6 is provided on the outer circumference of the boot 4 so as to be positioned at the corresponding axial position as the boot-engaging groove of the outer member 22 of the inboard joint 2, while urging the boot 4 toward the outer member 22. The clamp member 7 is adapted to fix the boot 4 onto the intermediate shaft 1. The clamp member 7 is provided on the outer circumference of the boot 4 so as to be positioned at the corresponding axial position as the boot-engaging groove 14 of the intermediate shaft 1, while urging the boot 4 toward the intermediate shaft 1.

The clamp member 8 is provided to fix the boot 5 onto the intermediate shaft 1. The clamp member 8 is provided on the outer circumference of the boot 5 so as to be positioned at the corresponding axial position as the boot-engaging groove 14 of the intermediate shaft 1, while urging the boot 5 toward the intermediate shaft 1. The clamp member 9 is adapted to fix the boot 5 onto the outer member 22 of the outboard joint 3. The clamp member 9 is provided on the outer circumference of the boot 5 so as to be positioned at the corresponding axial position as the boot-engaging groove of the outer member 22 of the outboard joint 3 while urging the boot 5 toward the outer member 22.

Detail of Both ends of Intermediate Shaft

Both end portions 19 of the intermediate shaft 1 will be explained in detail with reference to the FIGS. 2 and 3. Since the both end portions 19 have the same construction in this embodiment, the explanation will be made in relation to one of the end portions 19.

Figure 2:
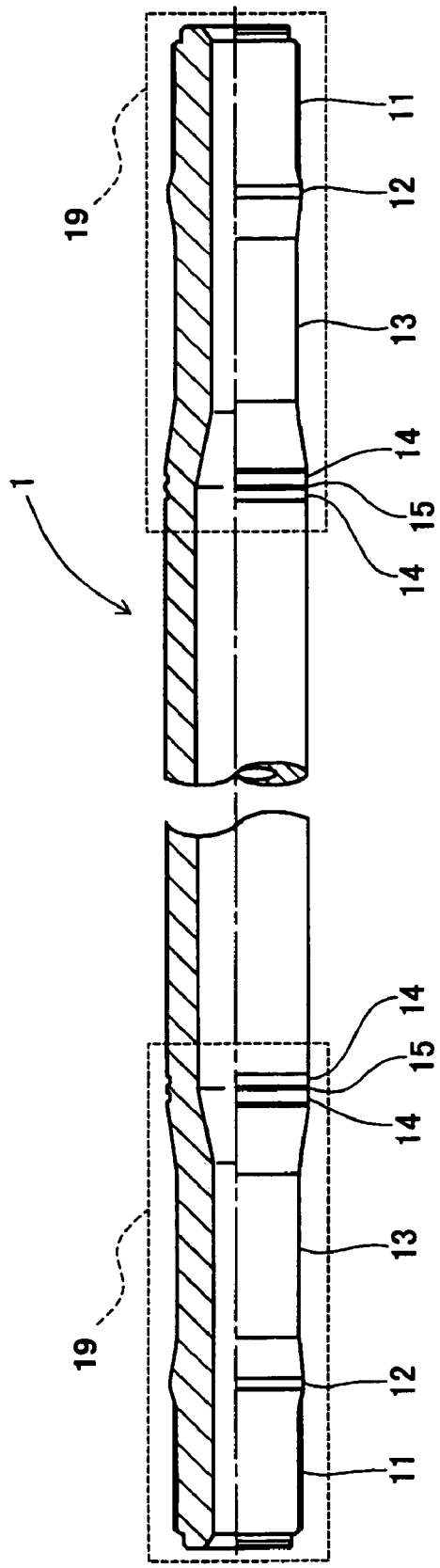
FIG. 2 is a partial cross sectional view of both end portions 19 of an intermediate shaft 1.

As shown in FIG. 2 which is a partial cross sectional view of both end portions 19 of an intermediate shaft 1, the end portion 19 includes a reduced diameter portion, the boot-engaging groove 14 and a seal portion 15. The reduced diameter portion includes the external serrations 11, an annular convex portion 12 and a concave portion 13. The diameter of the reduced diameter portion is smaller than that of an axial center portion of the intermediate shaft 1. The external serrations 11 are formed at an outer circumference of a tip end of the intermediate shaft 1 to extend in the axial direction thereof. The convex portion 12, which protrudes radially outwardly with respect to the intermediate shaft 1, is adjacent to the external serrations 11 at a side thereof toward the axial center of the intermediate shaft 1. The concave portion 13, whose diameter is smaller than that of the convex portion 12, is formed at axial center side of the intermediate shaft 1 with respect to the convex portion 12. At both ends of the concave portion 13 are provided slant portions whose diameters gradually vary in the axial direction of the intermediate shaft.

Two boot-engaging grooves 14 having an annular shape are formed toward an axial center side of the intermediate shaft 1 with respect to the concave portion 13. A predetermined distance in the axial direction is provided between the boot-engaging grooves 14. The boot-engaging grooves 14 are formed in the vicinity of the slant portion which located toward axial center side of the intermediate shaft 1. The seal portion 15 whose diameter is approximately the same as that of the axial center portion of the intermediate shaft 1 is provided between the boot-engaging grooves 14.

The boot-engaging grooves 14 and the seal portion 15 will be explained in further detail with reference to FIG. 3, which is an enlarged cross sectional view of the intermediate shaft 1.

Figure 3:
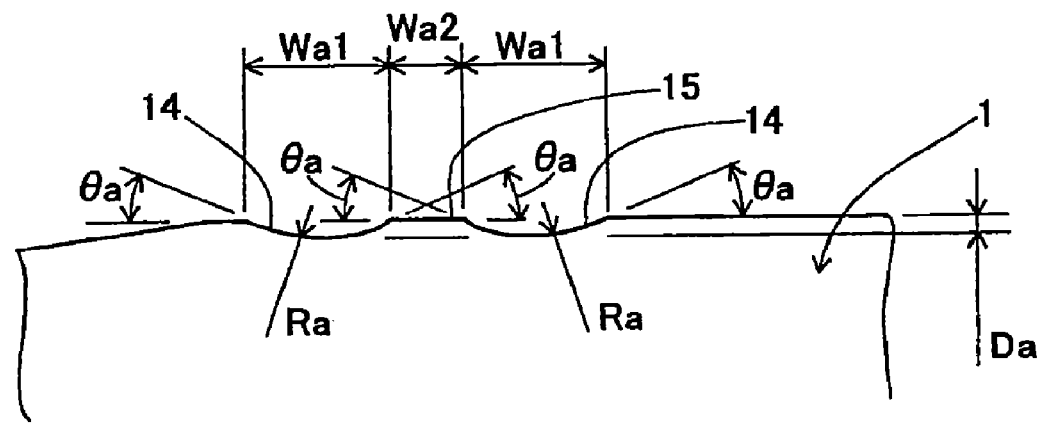
FIG. 3 is an enlarged cross sectional view of the intermediate shaft 1.

As shown in FIG. 3, each of the boot-engaging grooves 14 is formed to have an approximately arc shape in its section taken along the axis of the intermediate shaft 1. Specifically, the boot-engaging groove 14 has a bottom portion whose curvature radius Ra is 2 to 2.5 mm. Further, the boot-engaging groove has edge portions whose angles θa of inclination with respect to the outer circumference of the intermediate shaft in cross section are set to 28 degrees. Depth Da of the boot-engaging groove 14 is set in the range of 0.44 to 0.55 mm. Width Wa1 of the boot-engaging groove 14 is set in the range of 2.5 to 3.3 mm. Width Wa2 of the seal portion 15 along the direction of the axis is set in the range of 1.1 to 1.9 mm.

Detailed Structure of the Boots

With respect to the boots 4 and 5, a portion which the boot-engaging grooves 14 of the intermediate shaft 1 engage will be explained with reference to FIG. 4, which is a partial sectional view of the portion. Since the boots 4 and 5 have the same construction in this embodiment, the explanation will be made in relation to the boots 4.

Figure 4:
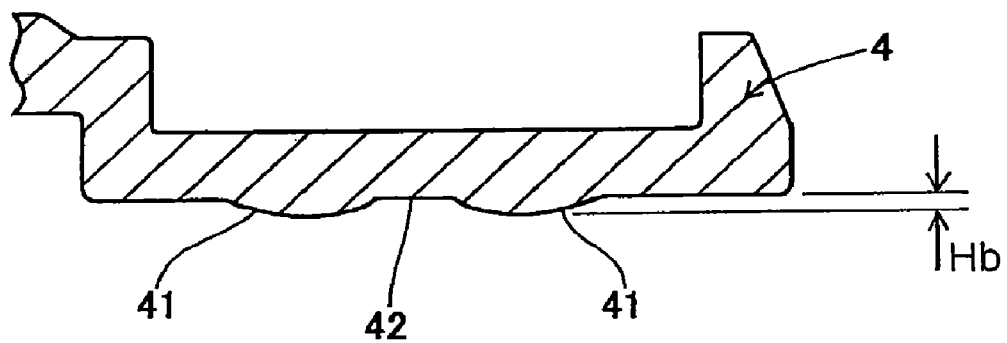
FIG. 4 is a partial sectional view of a boot, showing a portion with which the boot-engaging grooves of the intermediate shaft engage.

As shown in FIG. 4, two protrusions 41 protruding inwardly are formed on an inner circumference of one end of the boot 4. A predetermined distance in the axial direction is provided between the protrusions. A seal portion 42 is provided between the protrusions 41. In the portion with which the boot-engaging groove 14 engages, the diameter of the seal portion 42 is set to be the same as portions other than the protrusions 41.

Clamping State of the Boots onto the Intermediate Shaft

A clamping state of the boots 4 and 5 onto the intermediate shaft 1 will be explained with reference to FIG. 5, which is an enlarged view of a portion indicated by "V" in FIG. 1. The explanation will be made in relation to the boot 4.

Figure 5:
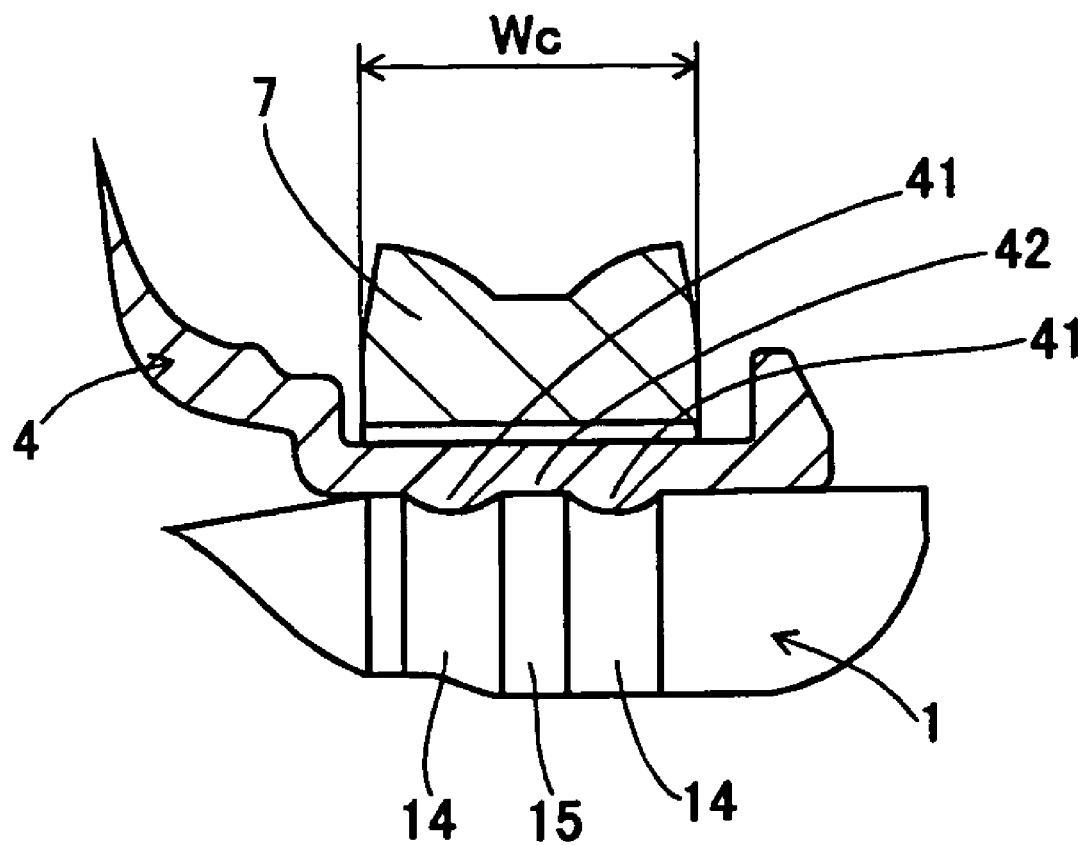
FIG. 5 is an enlarged view of a portion indicated by V in FIG. 1.

As shown in FIG. 5, the protrusions 41 of the boot 4 respectively engage with the boot-engaging grooves 14 of the intermediate shaft 1. The height Hb of the each protrusion 41 is set to be smaller than the depth Da of the boot-engaging groove 14. Accordingly, the seal portion 42 of the boot 4 comes into contact with the seal portion 15 of the intermediate shaft 1.

The outer circumference of the boot 4 corresponding to the protrusions 41 and the seal portion 42 is clamped by the clamp member 7 (8), so that the boot 4 is urged toward the intermediate shaft 1. In this manner, the boot 4 is fixed to the intermediate shaft 1.

The width Wc of the clamp member 7 (8) is 10 mm in this embodiment. The protrusions 41, the seal portion 42, the boot-engaging groove 14 and the seal portion 15 are included within the range corresponding to the width Wc of the clamp member 7 (8) in the axial direction of the intermediate shaft 1.

By clamping the boot 4 with the protrusions 41 engaging with the boot-engaging grooves 14, the boot 4 can be surely positioned with respect to the intermediate shaft 1 in the axial direction. The aforementioned structure of the boot-engaging groove 14 enhances the accuracy of the positioning of the boot 4. By clamping the boot 4 with the seal portion 42 being contact with the seal portion 15, sealing accuracy can be assured. The aforementioned structure of the boot-engaging groove 14 enhances the sealing accuracy.

The sealing accuracy is determined mainly by both edge portions provided at both axial ends of the boot-engaging groove. Thus, it may be sufficient, for positioning of the boot 4 with respect to the intermediate shaft 1, to provide only one protrusion on the inner circumference of the boot 4.

Forming Process of the Intermediate Shaft

The forming process of the Intermediate shaft 1 having the aforementioned structure will now be explained. The intermediate shaft 1 is obtained by forming the outer circumference of a hollow bar into a predetermined shape by means of swaging. Specifically, both end portions of the intermediate shaft 1 are formed by means of swaging.

Figure 6B:
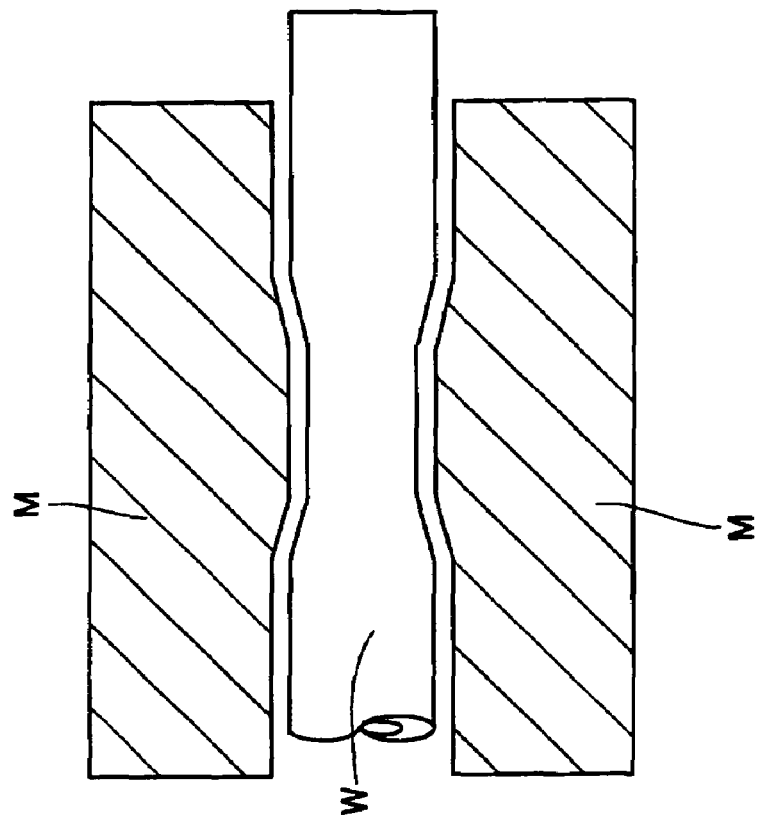
FIGS. 6(A) and 6(B) are views for explaining a forming process of swaging.
Figure 6A:
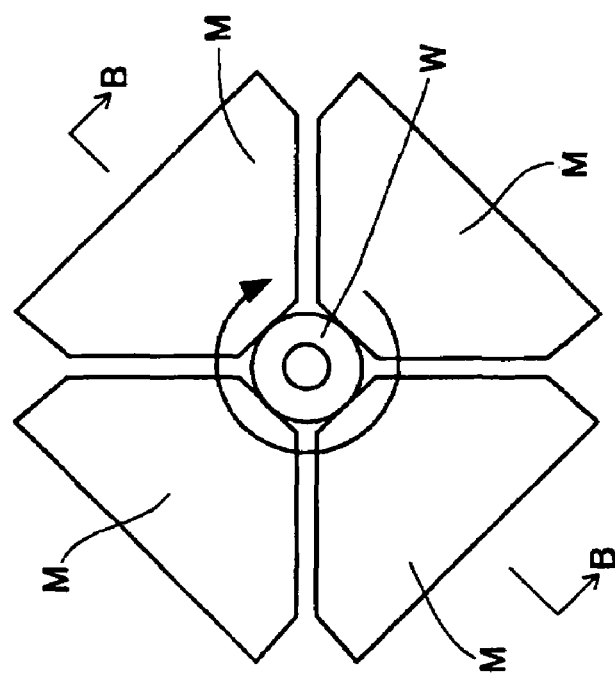

The swaging process will be briefly explained with reference to FIGS. 6(A) and 6(B). FIG. 6(A) is a view in the axial direction of a workpiece W for explaining the working process of swaging, and FIG. 6(B) is a sectional view taken along with the B-B line in FIG. 6 (A).

The workpiece W having a bar-shape or rod-shape is rotatably supported at both ends thereof. Dies M, which are able to advance and to retract in the radial direction of the workpiece W, are disposed around the workpiece W. The dies M repeatedly advance and retract in the radial direction with the workpiece W rotating. In this manner, a form defined at an inner surface of each die M is gradually transferred to an outer circumference of the workpiece W.

The form defined at the inner surface of the die M is designed so that the external serrations 11, the convex portion 12, the concave portion 13, the boot-engaging grooves 14 and the seal portion 15 are transferred to the outer circumference of the workpiece W. In other word, the external serrations 11, the convex portion 12, the concave portion 13, the boot-engaging grooves 14 and the seal portion 15 are formed on the workpiece W in one operation.

Underfill or rollover may occur when forming the groove on the outer circumference of the workpiece W is performed by swaging. However, the aforementioned structure of the boot-engaging groove 14 prevents underfill and rollover from occurring around the same. Accordingly, sealing and positioning accuracy of the boots 4 and 5 with respect to the intermediate shaft 1 is further enhanced.

In the above-described embodiment, the diameter of the seal portion 15 is set to be the same as that of the axial central portion of the intermediate shaft. That is, the diameter of the seal portion 15 is not reduced by the swaging. However, the diameter of the seal portion 15 may be reduced by the swaging. With this configuration, continuity from the seal portion 15 to the boot-engaging grooves 14 is enhanced. Accordingly, accuracy in the form of the edge portion provided at axial end of boot-engaging groove is improved, thereby further assuring sealing accuracy.

In the power transmission shaft of this embodiment, the boot-engaging groove is not formed by machining or cutting but by swaging. Swaging requires lower cost to carry out than machining or cutting. Accordingly, the power transmission shaft of the embodiment is produced at lower cost as compared to the conventional power transmission shaft whose boot-engaging groove is formed by means of machining or cutting. The power transmission shaft as the workpiece may be hollow or solid. The boot-engaging groove can be formed on either a hollow shaft or a solid shaft.

Further, according to the present embodiment, the boot-engaging groove and the reduced diameter portion, i.e. the external serrations, convex portion and concave portion, are formed by swaging at the same time, whereby the number of forming or machining operations can be reduced. As a result, low cost production can be achieved.

It is preferable to set the depth of the boot-engaging groove in the range 0.3 to 0.55 mm. In case the depth of the boot-engaging groove is smaller than 0.3 mm, positioning accuracy of the boot with respect to the power transmission shaft may be deteriorated. On the other hand, in case the depth of the boot-engaging groove is greater than 0.55 mm, the occurrence of underfill or rollover at the edge portion may be increased. When the boot-engaging groove is formed on the power transmission shaft, such underfill or rollover may occur due to flowing of material or metal. As a result, the width of the boot-engaging groove is unexpectedly expanded, whereby the positioning accuracy of the boot with respect to the power transmission shaft may be deteriorated. Therefore, by setting the depth of the boot-engaging groove in the range of 0.3 to 0.55, the boot is surely positioned in the axial direction with respect to the power transmission shaft.

The edge portion of the boot-engaging groove inclines with respect to the outer circumference of the power transmission shaft. If the angle of the inclination is 90 degrees, the section of the boot-engaging groove becomes rectangular shape. As the angle approaches 0 degrees, the inclination of the edge portion becomes gradual. Further, in case that the angle is smaller than 20 degrees, the positioning accuracy of the boot with respect to the power transmission shaft is deteriorated. On the other hand, in case that the angle is greater than 35 degrees, occurrence of underfill or rollover at the edge portion may be increased. Thus, the positioning accuracy of the boot with respect to the power transmission shaft may be deteriorated. Therefore, by setting the inclination angle of the edge portion of the boot-engaging groove in the range 20 to 35 degrees, the boot is surely positioned in the axial direction with respect to the power transmission shaft.

By avoiding any sharp angles in the boot-engaging groove, stress concentrations in the boot-engaging groove can be avoided, whereby durability and life duration of the power transmission shaft is improved. Especially, it is preferable that the boot-engaging groove includes a bottom portion formed into a circular arc in section and a curvature radius of the bottom portion is set to be equal to or greater than 2 mm. With this configuration, stress concentrations can be surely avoided. If a curvature radius of the bottom portion is much greater, the depth of the boot-engaging groove becomes smaller when the depth of the boot-engaging groove is set to certain value. Thus, it is preferable to set the curvature radius of the bottom portion equal to or smaller than 2.5 mm, thereby assuring sufficient depth.

The power transmission device of this embodiment incorporates the aforementioned power transmission shaft. Thus, the same effect or benefit as the power transmission shaft is achieved.

The embodiment described herein is to be regarded as illustrative rather than restrictive. Plural objectives are achieved by the present invention, and yet there is usefulness in the present invention as far as one of the objectives are achieved. Variations and changes may be made by others, and equivalents employed, without departing from spirit of the present invention. Accordingly, it is expressly intended that all variations, changes and equivalents which fall within the spirit and scope of the present invention as defined in the claims, be embraced thereby.

What we claim is:

1. A power transmission shaft comprising:
   a power transmission shaft member; and
   a swaged boot-engaging groove on an outer circumference of the power transmission shaft member,
   wherein a depth of the boot-engaging groove is set in the range 0.3 to 0.55 mm and an angle of inclination of an edge portion of the swaged boot-engaging groove with respect to the outer circumference of the power transmission shaft member is set in the range of 20 to 35 degrees, whereby the swaged boot-engaging groove does not exhibit underfill or rollover.

2. The power transmission shaft according to claim 1, further comprising a reduced diameter portion provided in the vicinity of the boot-engaging groove;
   wherein the reduced diameter portion is a swaged portion formed at the same time as the boot-engaging groove.

3. The power transmission shaft according to claim 1, wherein the boot-engaging groove does not include any sharp angles in the axial direction of the power transmission shaft member.

4. The power transmission shaft according to claim 3, wherein the boot-engaging groove comprises a bottom portion formed into a circular arc, and wherein a curvature radius of the bottom portion is equal to or greater than 2 mm.

5. A power transmission device comprising:
   a power transmission shaft including; a swaged boot-engaging groove formed on a outer circumference of the power transmission shaft; and a seal portion formed on the outer circumference of the power transmission shaft in the vicinity of the boot-engaging groove;
   a boot having an approximately cylindrical shape and including; a protrusion protruding from an inner circumference of the boot to come into contact with the boot-engaging groove of the power transmission shaft; and a seal portion formed in the vicinity of the protrusion to come into contact with the seal portion of the power transmission shaft; and
   a clamp member clamping an outer circumference of the boot at a position which corresponds to the protrusion and the seal portion of the boot so as to urge the boot toward the power transmission shaft,
   wherein the depth of the boot-engaging groove is set in the range of 0.3 to 0.55 mm and an angle of inclination of an edge portion of the swaged boot-engaging groove with respect to the outer circumference of the power transmission shaft member is set in the range of 20 to 35 degrees, whereby the swaged boot-engaging groove does not exhibit underfill or rollover.

6. The power transmission shaft according to claim 5, wherein the power transmission shaft further comprising a swaged reduced diameter portion provided in the vicinity of the boot-engaging groove, wherein the reduced diameter portion is formed by swaging at the same time as the boot-engaging groove is formed.

7. The power transmission shaft according to claim 5, wherein the boot-engaging groove does not include any sharp angles in the axial direction of the power transmission shaft.

8. The power transmission device according to claim 7, wherein the boot-engaging groove comprises bottom portion formed into circular arc, and wherein curvature radius of the bottom portion is equal to or greater than 2 mm.

9. A power transmission device comprising:
   a power transmission shaft including a boot-engaging groove and a seal portion;
   a constant velocity joint connected to the power transmission shaft;
   a boot positioned for covering a connecting portion between the constant velocity joint and the power transmission shaft and including a protrusion and a seal portion; and
   a clamp member positioned for clamping the boot;
   wherein the boot-engaging groove is a swaged groove formed on an outer circumference of the power transmission shaft, the seal portion of the power transmission shaft is formed on the outer circumference of the power transmission shaft in the vicinity of the boot-engaging portion, the protrusion protrudes from an inner circumference of the boot to come into contact with the boot-engaging groove, the seal portion of the boot is formed in the vicinity of the protrusion to come into contact with the seal portion of the power transmission shaft, and the clamp member clamps an outer circumference of the boot at a portion which corresponds to the protrusion and the seal portion of the boot so as to urge the boot toward the power transmission shaft,
   wherein the depth of the boot-engaging groove is set in the range of 0.3 to 0.55 mm and an angle of inclination of an edge portion of the swaged boot-engaging groove with respect to the outer circumference of the power transmission shaft member is set in the range of 20 to 35 degrees, whereby the swaged boot-engaging groove does not exhibit underfill or rollover.

* * * * *